Sept. 2, 1941.  J. W. WELSH  2,254,637
OPHTHALMIC MOUNTING
Filed Jan. 3, 1940
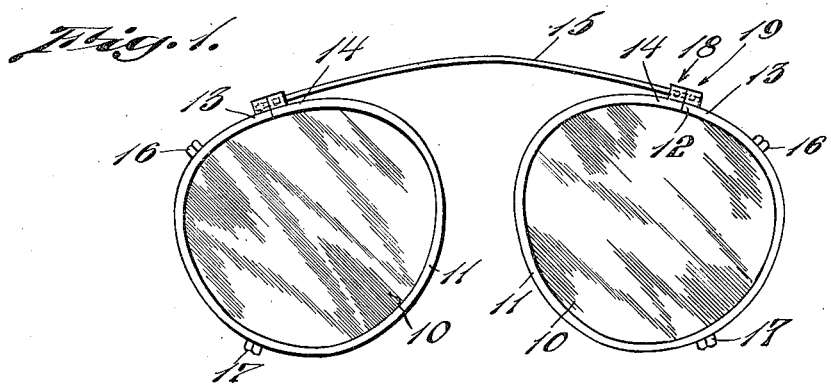
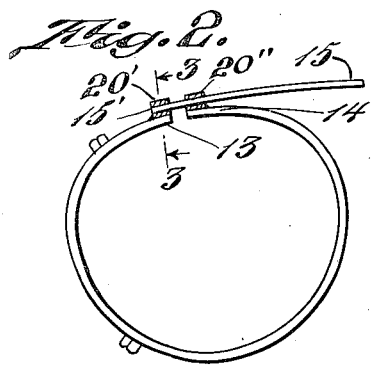
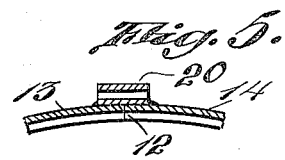
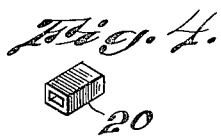
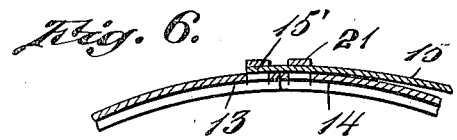
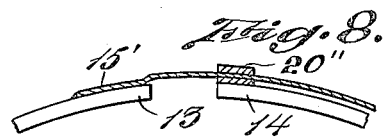
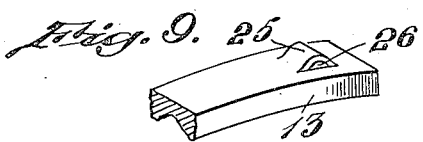
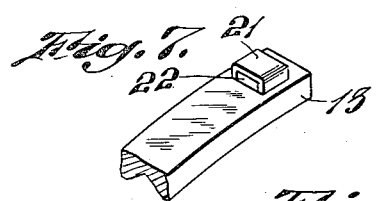
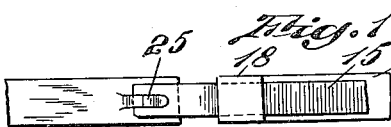
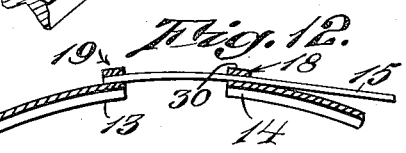
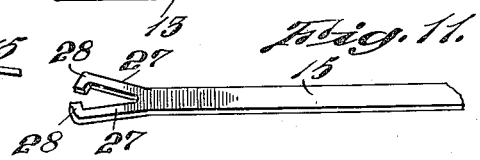
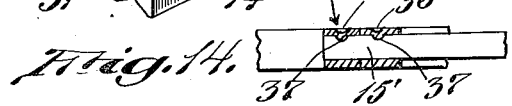
INVENTOR.
James W. Welsh
BY Barlow & Barlow
ATTORNEYS.

Patented Sept. 2, 1941

2,254,637

UNITED STATES PATENT OFFICE 2,254,637

OPHTHALMIC MOUNTING

James W. Welsh, Providence, R. I., assignor to Welsh Manufacturing Company, a corporation of Rhode Island Application January 3, 1940, Serial No. 312,218

1 Claim. (Cl. 88—47)

This invention relates to an ophthalmic mounting and has for one of its objects to provide a minimum number of parts for the securing of certain results with a consequent reduction in cost of assembling the complete unit.

A further and more specific object of the invention is to reduce the number of soldering operations necessary in the assembly of a rim for mounting a lens.

Another object of the invention is to provide a means whereby a bridge may be secured to rims without the use of solder.

Another object of the invention is to utilize the bridge in the mounting of the lens in the rim.

With these and other objects in view, the invention consists of certain novel features of construction, as will be more fully described and particularly pointed out in the appended claim.

In the accompanying drawing:

Fig. 1 is a front elevation of a mounting equipped with my invention;

Fig. 2 is an elevation partly in section illustrating the mounting of the bridge and the ends of the rim;

Fig. 3 is a section on line 3—3 of Fig. 2;

Fig. 4 is a perspective view of one of the parts which may be utilized for a guide or for the bridge end connection;

Fig. 5 is a sectional view illustrating the part in Fig. 4 as mounted in position;

Fig. 6 is a sectional view of a modified form of rim ends and bridge on a greatly enlarged scale;

Fig. 7 is a perspective view of one of the rim ends constructed as shown in Fig. 6;

Fig. 8 is a sectional view similar to Fig. 6 but showing a different modified arrangement of the parts;

Fig. 9 is a perspective view of a still different modification;

Fig. 10 is a top plan view of two rim ends and bridge all fragmentally shown, illustrating the use of the rim end shown in Fig. 9;

Fig. 11 is a perspective view of a bridge end of the construction used in connection with Fig. 10;

Fig. 12 is a sectional view of a still different modified arrangement of rim ends and bridge;

Fig. 13 is a perspective view of one of the rim ends shown in Fig. 12; and

Fig. 14 is a sectional view showing the manner of locking the bridge and rims in relative position.

It is frequently desirable to position upon other ophthalmic mountings a supplementary lens which is frequently referred to as a "hook-on" device, and may consist of colored glass or smoked glasses for the dimming of light transmitted to the eye, and in such a construction it has been frequent to connect a pair of rims by a bridge and at a point different from the connection of the bridge to the rim providing for separation of the rim in order that a lens might be placed in the rim and then the split ends brought together for securing the ends and holding the lens in position. Also, there has been provided a combined securing of a bridge to a rim by locating the split of the rim close to the connection of the bridge thereto and then by use of a threaded member connecting the rim ends together. In such constructions the parts on the rim ends have been soldered to these rim ends, and in order to reduce the cost of soldering and of providing threaded members, I have arranged a construction whereby when assembly is made, the rims may be locked in closed position about the lenses by deflecting the stock of one part so that it may firmly engage or interlock with the other part to which it is to be secured, and I have also arranged for the formation of connecting parts out of the stock of the rims themselves so that in some instances it will be unnecessary to provide any soldering of a connection in order to perform the desired mounting of the lens, and the following is a more detailed description of the present embodiment of this invention, illustrating the preferred means by which these advantageous results may be accomplished:

With reference to the drawing, 10, 10 designates a pair of lenses and 11, 11 rims about these lenses. The split at the abutted ends of the rims is designated 12 and exists between an outer end rim portion 13 and a nasal end rim portion 14. A bridge 15 is connected to the rims in a manner which will be hereinafter described in detail, while hooks 16, 17 are provided on each of the rims for engaging some ophthalmic mounting upon which this supplementary unit often termed a "hook-over" is mounted.

In all of the various arrangements I have provided a guide designated generally 18 on the nasal end of the rim and some means 19 on the outer end of the rim for securing the end of the bridge 15 to this outer rim end. In all arrangements initially the guide 18 will be slidable along the bridge 15 but may be locked in closed position without threading and without solder to hold the lens 10 mounted in the rim.

In Fig. 5, I position the rim ends 13 and 14 in engagement providing the split 12, and then solder a tube 20 (see Fig. 4) onto the ends 13 and 14 to bridge the split 12 as illustrated in Fig. 5. Thereafter I sever the tube 20 to provide a separate part 20' secured to the outer rim end 13 and a separate part 20" secured to the nasal rim end 14. The member 20 is of such size that it will slidably receive the end of the bridge 15 therethrough and then by nicking or prickpunching the stock of the portion 20' (as at 35 in Fig. 14), the detents 36 are forced into a recess 37 in the end 15' of the bridge. I may lock the bridge to this rim end 13 while the portion 20" of this tube provides a slide which may be moved along the bridge 15 so as to open or close the rim ends 13 and 14.

In Fig. 8 instead of securing the bridge end in this manner I have soldered the bridge end 15' to the outer rim end 13 as there illustrated, while the tube 20" is slidably arranged upon the bridge as previously described.

In Fig. 7 I have illustrated the stock of the rim end raised as at 21 so as to provide a slot 22 for slidably receiving the bridge end 15' therein. This same structure is duplicated upon the rim end 14 so that the bridge 15 will slide through the raised strap or guide on this nasal end of the rim. After the bridge has been inserted in this manner it is suitably secured by prickpunching or nicking the stock of the raised strap 21 so as to lock it to the end of the bridge 15 as above described (see Fig. 14).

In Fig. 10 a suitable guide 18, which may be of any of the forms heretofore described, is provided upon the nasal end 14 of the rim, while an eye 25 is raised in the stock of the outer rim end 13 by forcing the stock up from beneath so as to form an opening 26 laterally across the rim end as illustrated in Fig. 9. In this case, the bridge 15 is modified as shown more clearly in Fig. 11 by bifurcating the end thereof to form spaced arms 27 with fingers 28 extending inwardly from these arms so that the arms 27 may be forced together to place the fingers into the opening 26 and lock the bridge to the outer end portion 13 of the rim.

In Fig. 12 I have illustrated the outer end of the rim 13 and also the nasal end of the rim 14 as being turned outwardly as at 30 and slotted as at 31 so that the bridge 15 may be slidably received through this slot in the outturned end of the rim. This bridge may be slid through these slots and locked in the part 19 secured to the outer rim end 13 while the guide 18 will be slidable along the bridge.

In all of the cases above illustrated, I have shown the bridge 15 as anchored in some convenient manner to the outer end of the rim by some anchor which I designate generally 19, which as I have illustrated might be in several various forms. I have also illustrated a guide designated generally 18 which may consist of either the part 20" of Fig. 2 or 8, 21 of Fig. 6, 30 of Fig. 12 or 13, designated generally in Fig. 10, which will slide along the bridge for expansion of the rim, such as illustrated in Fig. 2 or 12, for the positioning of the lens into the rim, after which the rim ends may be moved to closed position as illustrated in Figs. 1 and 6 so as to hold the rim firmly about the lens and when this relationship of the rim is secured by forcing inwardly, or as frequently called, nicking or prickpunching, a part of the guide designated generally 18 as shown in Fig. 14 and as above described so as to lock this end of the rim firmly about the lens.

By this securing I eliminate the necessity of providing a split rim at a location different from the connection of the bridge thereto and I utilize the bridge in the opening and closing of the rim about the lens. Further, after closing has taken place I secure the rim without the use of any solder or threaded connection.

In some of the forms which I have illustrated, no solder whatever is used. For instance, in Figs. 6, 7, 12 and 13, both the guide and means for securing the end of the bridge to the outer rim end are integral with the rim so that no solder is used in constructions following the teaching of these figures, and thus this construction is exceedingly inexpensive.

In the construction illustrated, in Figs. 9 to 11, the rim end is secured without the use of solder, and where a guide such as that of Fig. 6 or 7 may be utilized, I will provide a further construction which requires no solder.

In the construction illustrated in Fig. 8, the bridge end is soldered to the rim, while the guide 20" is soldered to the rim end, thus utilizing two soldering operations which is a reduction from that usually used in mountings of this character. Also, in Fig. 2 I have illustrated a single soldering, that of providing the tube 20 upon the rim ends at one time, and then splitting this construction to provide two parts, thus providing for but a single soldering.

The foregoing description is directed towards the method and construction illustrated, but I desire it to be understood that I reserve the privilege of resorting to all the equivalent changes to which the construction and method are susceptible, the invention being defined and limited only by the terms of the appended claim.

I claim:

In an ophthalmic mounting having a pair of split lens rims, each having an inner nasal end and an outer rim end, an eye provided on each outer rim end, a bridge having each end bifurcated with fingers engaging each eye, and a guide on the nasal ends of said rims embracing the bridge for sliding therealong to and from closed position.

JAMES W. WELSH.